United States Patent [19]
Paros

[11] 4,384,495
[45] May 24, 1983

[54] MOUNTING SYSTEM FOR APPLYING FORCES TO LOAD-SENSITIVE RESONATORS

[75] Inventor: Jerome M. Paros, Redmond, Wash.

[73] Assignee: Quartex, Inc., Salt Lake City, Utah

[21] Appl. No.: 207,694

[22] Filed: Nov. 17, 1980

[51] Int. Cl.³ ............................................. G01L 1/10
[52] U.S. Cl. ............................... 73/862.59; 73/DIG. 1
[58] Field of Search ............... 73/862.59, 581, 778, 73/DIG. 1

[56] References Cited

U.S. PATENT DOCUMENTS 3,470,400  9/1969  Weisbord ........................ 73/781
3,479,536  11/1969  Norris ........................... 73/862.59
4,299,122  11/1981  Ueda et al. ..................... 73/862.59

FOREIGN PATENT DOCUMENTS 2203204  6/1979  Fed. Rep. of Germany ... 73/862.59
55-149818  11/1980  Japan ........................... 73/862.59

Primary Examiner—Anthony V. Ciariante
Attorney, Agent, or Firm—Seed, Berry, Vernon & Baynham

[57] ABSTRACT

A mounting structure for double-bar resonators to ensure symmetrical loading of the resonator responsive to external forces. In one embodiment, the resonator is connected to a pair of mounting pads through compliant coupling members. The coupling members allow longitudinal, force-induced displacements of the mounting pads to load the resonator while making the resonator insensitive to spurious transverse displacements of the mounting pads. In another embodiment, a force is applied to a load-sensitive, double-bar resonator through a force-transmitting bar which is mounted on an elongated flexure hinge. The hinge is compliant about an axis of rotation which is perpendicular to the longitudinal axis of the resonator so that the hinge attenuates any force component acting perpendicular to the longitudinal axis of the resonator which would otherwise non-symmetrically load the resonator.

9 Claims, 4 Drawing Figures

MOUNTING SYSTEM FOR APPLYING FORCES TO LOAD-SENSITIVE RESONATORS

DESCRIPTION

1. Technical Field

This invention relates to mounting systems for double-bar resonators and, more particularly, to a mounting system which minimizes non-symmetrical loading of the resonator.

2. Background Art

In an unstressed condition, under constant environmental conditions, a crystal has a unique resonant frequency determined by its dimensions and material composition. The resonant frequency increases under tensile loading and decreases under compressive loading. The resonant frequency should thus be a true and accurate measure of the applied load.

Force-sensitive crystals are described in U.S. Pat. No. 2,984,111, issued to Kritz, and U.S. Pat. No. 3,238,789, issued to Tarasevich, in which loads are applied to the crystals near the nodal points. Imprecise location of these nodal points results in energy transmission through the mounts, degrading the "Q," or "quality factor," of the resonator, with a consequential loss of accuracy. Also, forces and moments produced by the mounting structure can be transmitted to the resonator due to the imprecise nodal point location.

U.S. Pat. No. 3,470,400, issued to Weisbord, describes a single-beam force transducer with integral mounting isolation which effectively decouples the beam vibrations from the mounting points through a spring and mass arrangement. This resonator is complex, relatively large, and difficult to manufacture.

A potentially small, simple, and easy to manufacture device using photolithography in the closed-end tuning fork described in U.S. Pat. No. 3,238,789, issued to Erdley. The Erdley device consists of two tines or bars vibrating 180 degrees out of phase such that the reactive forces and moments cancel. It is important to have a high "Q" oscillator having only one resonant peak in order to uniquely define the applied load. If the two bars are infinitely coupled together, or of the exact same frequency, then only one peak occurs. If the bars have different resonant frequencies or if they are loaded unequally, the resonant frequencies of the bars can become mismatched sufficiently to overcome the coupling between the bars. As a result, energy transfer can occur between the bars, thereby lowering the "Q" of the oscillator since the forces and moments between bars or tines do not cancel. Also, more than one resonant peak may occur. If multiple peaks are produced, the force-versus-frequency curve is not uniquely defined, and discontinuities in operation can occur. Similarly, the unequal loading and consequent frequency mismatch can cause frequency "pulling" of a dominant mode. Degradation in "Q" can cause cessation of operation or at least a degradation of performance insofar as the resonance is less well defined.

DISCLOSURE OF THE INVENTION

It is an object of the invention to provide a small, accurate, high "Q," load-sensitive resonator having a uniquely defined resonance over a wide loading range.

It is another object of the invention to provide a structure for coupling a force to a closed-end tuning fork resonator which attenuates spurious moments, misalignments, and forces in order to symmetrically load the resonator.

These and other objects of the invention are provided by a load-sensitive resonator including a double tuning fork resonator having a pair of elongated parallel bars extending between spaced-apart nodes. A pair of mounting pads are connected to the respective nodes through relatively thin coupling members. The coupling members are positioned midway between the bars, and they have a common longitudinal axis which is parallel to the bars of the resonator. Consequently, the coupling members are relatively rigid in a longitudinal direction parallel to the bars and relatively compliant in a transverse direction perpendicular to the bars. A force-transmitting member which is constrained to move in a substantially longitudinal direction is secured to the mounting pads to apply force between the mounting pads. Consequently, the coupling members transmit longitudinal displacements of the mounting pads to the tuning fork bars while absorbing transverse displacements of the mounting pads, thus minimizing nonsymmetrical loading of the resonator. In another embodiment, the double tuning fork resonator is connected to a force-transmitting member which is pivotally mounted on a flexure hinge. The flexure hinge has a pivot axis which is perpendicular to the longitudinal axis of the resonator so that pivotal movement of the force-transmitting member loads the resonator. The transverse rigidity of the hinge restricts the application of transverse forces to the resonator, thus minimizing non-symmetrical loading of the resonator.

BEST MODE FOR CARRYING OUT THE INVENTION

Under constant environmental conditions, the resonant frequency in Hertz, $f_o$, of an unstressed, fixed-ended, flexurally vibrating beam of length L, thickness t, width b, modulus of elasticity E, and density d is given by the formula:

$$f_o = (\text{Constant}) \frac{t}{L^2} \sqrt{\frac{E}{d}} \qquad \text{(Equation 1)}$$

Although the resonant frequency is generally a non-linear function of the applied load F, the first-order load sensitivity S may be calculated as:

$$S = (\text{Constant}) \frac{L^2 F}{E b t^3} \qquad \text{(Equation 2)}$$

The quantitative relationships between resonant frequency, applied load, and resonator dimensions and compositions can be determined from the above formulas.

Figure 1:
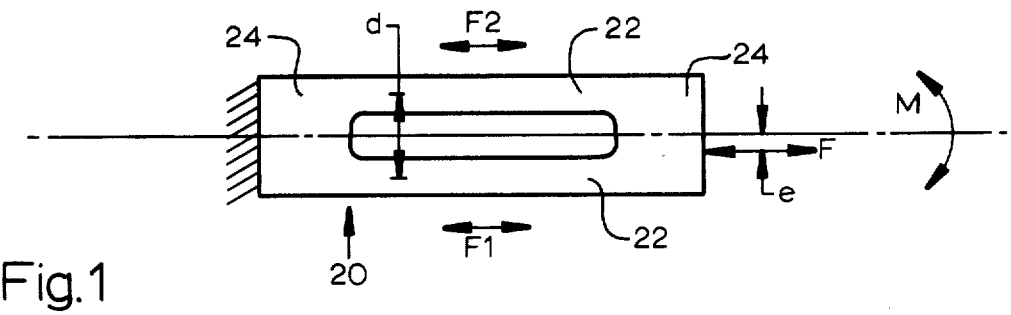
FIG. 1 is a plan view illustrating a conventional closed-end tuning fork force resonator subjected to force and moment loads.

FIG. 1 is a plan view showing a conventional closed-end tuning fork 20 as described in the aforementioned patent to Erdley. This device 20 achieves low energy loss characteristic of high "Q" operation by driving a pair of closely matched tines 22 180 degrees out of phase, thus cancelling the reactive moments and forces which might be transmitted to mounting nodes 24 from which the tines 22 project. Even if the tines 22 of a force sensor are precisely matched dimensionally in the unstressed state, they will not have the same resonant frequency if no provisions have been made for equal loading. Unequal tine stress can result from dimensional differences, eccentric loads, and applied moments.

As illustrated in FIG. 1, if the tines 22 are separated by a distance d, and an axial load F is applied off-center by dimension e, together with application of moment M about an axis perpendicular to the plane of tine vibration, then the unequal loading $F_2 - F_1$ between the tines 22 is given by:

$$F_2 - F_1 = \frac{2Fe}{d} + \frac{2M}{d} \quad \text{(Equation 3)}$$

Unequal loading of the tines 22 will similarly result from a force F which is not parallel to the longitudinal axis of the resonator even though the force is centered. The applied stress causes a change in resonant frequency as given by Equation 2, and the unequal loading of the tines thus causes frequency mismatch between the tines 22. If the frequency mismatch is large enough to overcome the coupling between tines, then more than one resonant peak can occur over the loading range of interest. Discontinuities in the force-versus-frequency output can occur if the electronic oscillator circuitry can lock in on more than one well-defined resonant peak. Furthermore, poor cancellation of end effects occurs with mismatched tines, resulting in energy dissipation through the munting nodes 24, thereby lowering the resonator "Q." Energy losses may be so great as to reduce the oscillator circuitry gain to less than one, resulting in a failure to maintain oscillations of the tines 22. Thus it is most important to substantially equalize the loads applied to the tines 22 so that a single, well-defined, high "Q" resonant peak occurs over the full loading range.

Figure 2A:
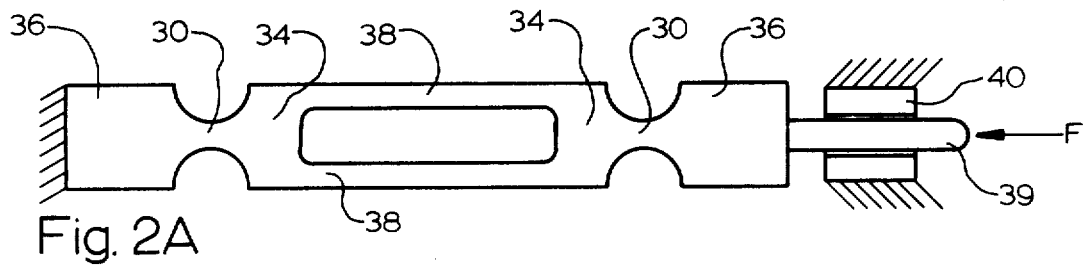
FIGS. 2A and 2B are plan views illustrating closed-end tuning fork resonators using the inventive centering flexure or compliant bars to reduce the sensitivity of the resonator to misalignments, spurious moments, and unequal loading.
Figure 2B:
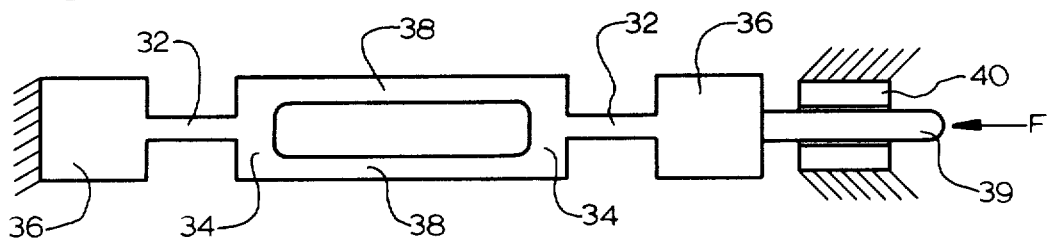

FIGS. 2A and 2B illustrate one embodiment of the inventive load-equalizing structure, which includes centering flexures 30 (FIG. 2A) and compliant bars 32 (FIG. 2B) extending between nodes 34 and respective mounting pads 36 which allow equal loading of tines 38. The flexures 30 are compliant about an axis perpendicular to the plane of tine vibration; however, the flexures 30 are relatively stiff in the cross-axis and longitudinal axis directions. The flexures 30 serve to reduce the effects of moments applied about an axis perpendicular to the plane of tine vibration by rotation of the mounting pads 36, caused either by initially mounting the pads 36 out of alignment or by rotational moments imparted by a force-transmitting member, such as a bar 39 fastened to one mounting pad 36 and slidably received by a fixed support frame 40. The force-transmitting member must be constrained to move in substantially a single direction since the flexure 30 is incapable of resisting moments applied to the mounting pads 36 without also applying those moments to the tines 38. Ideally, the force-transmitting member applies a force to the mounting pads 36 at the center of the pads 36 and in a longitudinal direction parallel to the tines 38. However, as a practical matter, the force-transmitting member may apply a force to the mounting pads 36 which is either off-center or not parallel to the tines 38. Either of these conditions causes the mounting pads to rotate and, if the flexure is not compliant, will non-symmetrically load the tines 38. The flexures, being highly compliant, reduce non-symmetrical tine loading, as expressed in Equation 3. The flexures 30 can be centered equally between the tines 38 to reduce the eccentric loading effects of Equation 3. This centering is readily accomplished by manufacturing the closed-end tuning fork configuration using conventional photolithographic techniques.

The compliant bars 32 of FIG. 2B absorb rotational movements of the mounting pads 36 in the same manner as the flexures 30. However, they are also capable of absorbing transverse movement of the mounting pads without applying significant non-symmetrical loads to the tines 38.

Figure 3:
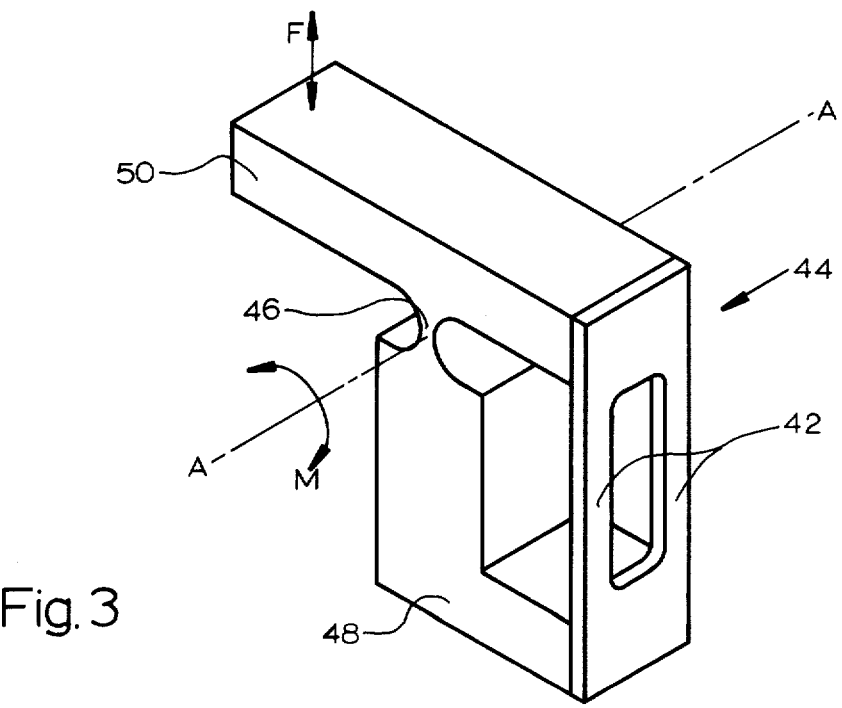
FIG. 3 is an isometric view illustrating an inventive mounting arrangement for a closed-end tuning fork resonator which allows equal loading at both tines.

One force-transmitting member constrained to move in a single direction is the bar 39 slidably mounted in the frame 40 of FIG. 2. Another force-transmitting structure which can be used with either a conventional double tuning fork or the flexure or compliant bar tuning fork of FIG. 2 is illustrated in FIG. 3. The structure of FIG. 3 allows equal forces to be applied to both tines 42 of a closed-end tuning fork resonator 44. A flexure hinge 46 connected between a base member 48 and a force-transmitting bar 50 operates as a compliant pivot about axis A—A while remaining quite stiff in the cross-axis direction. The hinge axis A—A is perpendicular to the longitudinal axis of the closed-end tuning fork resonator 44 such that the plane of vibration of the tines 42 is parallel to the compliant axis A—A. Thus, only those forces F and moments M which produce a torque about axis A—A are applied to the closed-end tuning fork resonator 44; and since both tines 42 are equidistant from axis A—A, they are substantially equally loaded. Substantially equal loading of the tines 42 occurs when the coupling between tines 42 is sufficient to maintain a single, well-defined, high "Q" resonant peak over the full loading range. For example, in an extreme case wherein the resonator 44 is mounted with the plane of tine vibration perpendicular to axis A—A, then the criteria for substantially equal loading would require a sufficiently large ratio of distance between pivot 46 and resonator 44 to separation between tines 42. Cross-axis forces and moments are sustained by the suspension system and not transmitted to the tines 42. The suspension system need not be a flexure hinge pivot but any device which is compliant about only one axis. To the extent that any cross-axis forces and moments are transmitted to the resonator 44, they can be isolated from the tines 42 by using the resonators of FIGS. 2A and 2B in place of the conventional resonator 44 as shown.

I claim:
1. A force transducer, comprising:
   a double tuning fork resonator having a pair of elongated parallel tines extending between spaced-apart nods; and
   a force-transmitting member pivotally mounted on a base through support means which are relatively compliant to moments acting about a pivot axis but relatively rigid to all other moments, said resonator having one of its nodes connected to said force-transmitting member, with the plane of the tines of said resonator parallel to and equidistant from said pivot axis such that pivotal movement of said force-transmitting member loads substantially equally said tines while the rigidity of said support means to moments not applied about said pivot axis restricts non-symmetrical loading of said resonator.

2. The force transducer of claim 1 wherein said support means is a flexure hinge extending between said base and force-transmitting member.

3. The force transducer of claim 2 wherein force is applied to said force-transmitting member at one side of said flexure hinge and said resonator is connected to said force-transmitting member on the opposite side of said hinge.

4. The force transducer of claim 2 wherein said resonator is connected to said force-transmitting member by a relatively thin coupling member extending between a node of said resonator midway between said tines, said coupling member being relatively rigid in a longitudinal direction parallel to said tines and relatively compliant about a pivot axis which is perpendicular to the plane occupied by said tines such that said coupling member transmits longitudinal forces to said tines without transmitting rotational moments from said force-transmitting member to said tines.

5. The force transducer of claim 1 wherein the distance between said support means and said resonator is substantially greater than the distance between the tines of said resonator in order to promote equal loading of said tines.

6. A force transducer, comprising:
a double tuning fork resonator having a pair of elongated parallel tines extending between spaced-apart nodes; and
a force-transmitting member mounted on a base through support means which are relatively compliant to moments applied about a pivot axis while relatively rigid to all other moments, said resonator having one of its nodes connected to said force-transmitting member at a location on said force-transmitting member which is spaced from said support means a distance that is substantially greater than the distance between the tines of said resonator such that pivotal movement of said force-transmitting member loads substantially equally said tines while the rigidity of said support means to moments not applied about said pivot axis restricts non-symmetrical loading of said resonator.

7. The force transducer of claim 6 wherein said support means is a flexure hinge extending between said base and force-transmitting member.

8. The force transducer of clam 6 wherein force is applied to said force-transmitting member at one side of said flexure hinge and said resonator is connected to said force-transmitting member on the opposite side of said hinge.

9. The force transducer of claim 6 wherein said resonator is connected to said force-transmitting member by a relatively thin coupling member extending between a node of said resonator midway between said tines, said coupling member being relatively rigid in a longitudinal direction parallel to said tines and relatively compliant about a pivot axis which is perpendicular to the plane occupied by said tines such that said coupling member transmits longitudinal forces to said tines without transmitting rotational moments from said force-transmitting member to said tines.

* * * * *